(12) United States Patent
Karlsen et al.

(10) Patent No.: US 11,320,073 B2
(45) Date of Patent: May 3, 2022

(54) SUBSEA CLAMP CONNECTOR AND SUBSEA CLAMP CONNECTOR ARRANGEMENT COMPRISING SUCH A CLAMP CONNECTOR

(71) Applicant: VETCO GRAY SCANDINAVIA AS, Sandvika (NO)

(72) Inventors: Morten Karlsen, Lier (NO); Roy-Petter Hestsveen, Baerums Verk (NO); Geir Terje Nevoy, Skui (NO)

(73) Assignee: VETCO GRAY SCANDINAVIA AS, Sandvika (NO)

( * ) Notice: Subject to any disclaimer, the term of this patent is extended or adjusted under 35 U.S.C. 154(b) by 489 days.

(21) Appl. No.: 16/302,003

(22) PCT Filed: May 16, 2017

(86) PCT No.: PCT/EP2017/061719
§ 371 (c)(1),
(2) Date: Nov. 15, 2018

(87) PCT Pub. No.: WO2017/198659
PCT Pub. Date: Nov. 23, 2017

(65) Prior Publication Data
US 2019/0162338 A1 May 30, 2019

(30) Foreign Application Priority Data
May 17, 2016 (NO) .................................... 20160835

(51) Int. Cl.
*F16L 23/10* (2006.01)
*F16L 21/06* (2006.01)
(52) U.S. Cl.
CPC .............. *F16L 23/10* (2013.01); *F16L 21/065* (2013.01); *F16L 2201/40* (2013.01)

(58) Field of Classification Search
CPC .............. F16L 21/06; F16L 23/10; F16L 1/26
(Continued)

(56) References Cited

U.S. PATENT DOCUMENTS

| 4,535,822 A | 8/1985 | Rogers, Jr. |
| 5,437,489 A | 8/1995 | Sanders et al. |

(Continued)

FOREIGN PATENT DOCUMENTS

| EP | 1559865 A2 | 9/1988 |
| EP | 2642171 A1 | 9/2013 |

(Continued)

OTHER PUBLICATIONS

PCT Search Report and Written Opinion issued in connection with corresponding Application No. PCT/EP2017/061719 dated Aug. 21, 2017.

(Continued)

*Primary Examiner* — Zachary T Dragicevich
(74) *Attorney, Agent, or Firm* — Baker Hughes Patent Org.

(57) ABSTRACT

A subsea clamp connector for connecting the ends of two tubular members to each other, the clamp connector including first and second clamping elements, which are pivotable into a closed position in clamping engagement with the ends of the tubular members; and a replaceable locking unit for locking the clamping elements in the closed position. The locking unit includes an operating shaft, a first retaining member mounted to the operating shaft and configured for engagement with a shoulder on a holding member fixed to the first clamping element, and a second retaining member mounted to the operating shaft and configured for engagement with a shoulder on a holding member fixed to the second clamping element. The locking unit is detachably mountable to the clamping elements by insertion of the (Continued)

operating shaft sideways into slots provided in the holding members.

8 Claims, 7 Drawing Sheets

(58) Field of Classification Search
USPC .................................... 285/406, 411, 420
See application file for complete search history.

(56) References Cited

U.S. PATENT DOCUMENTS

| | | | |
|---|---|---|---|
| 5,513,228 A | | 4/1996 | Malmasson |
| 5,522,625 A | * | 6/1996 | Flick ........................ F16L 23/10 285/411 |
| 5,645,303 A | | 7/1997 | Warehime et al. |
| 5,653,481 A | * | 8/1997 | Alderman ............... F16L 23/10 285/411 |
| 6,003,548 A | * | 12/1999 | Muchow ........................ 285/420 |
| 7,861,982 B1 | * | 1/2011 | McClure ........................ 285/420 |
| 2005/0000062 A1 | * | 1/2005 | Lin ........................ F16L 23/10 |
| 2008/0265568 A1 | * | 10/2008 | Bekkevold ................ F16L 1/26 |
| 2010/0314864 A1 | | 12/2010 | Lemke et al. |
| 2017/0191589 A1 | * | 7/2017 | Floyd ....................... F16L 23/10 |

FOREIGN PATENT DOCUMENTS

| | | |
|---|---|---|
| EP | 2722479 A1 | 4/2014 |
| GB | 2082230 A | 3/1982 |
| GB | 2488372 A | 8/2012 |
| WO | 97011301 A1 | 3/1997 |
| WO | 20120108775 A1 | 8/2012 |
| WO | 20120172163 A1 | 12/2012 |
| WO | 2016005364 A1 | 1/2016 |
| WO | 2016066740 A1 | 5/2016 |

OTHER PUBLICATIONS

NO Office action issued in connection with corresponding Application No. 20160835 dated Dec. 12, 2016.

* cited by examiner

SUBSEA CLAMP CONNECTOR AND SUBSEA CLAMP CONNECTOR ARRANGEMENT COMPRISING SUCH A CLAMP CONNECTOR

FIELD OF THE INVENTION

Embodiments of the present invention relate to a subsea clamp connector for connecting and securing an end of a tubular member to an abutting end of another tubular member. Embodiments of the invention also relate to a subsea clamp connector arrangement comprising such a clamp connector.

A clamp connector according to the preamble of claim 1 is previously known from EP 2 642 171 A1. This known clamp connector is provided with an operating shaft which extends through two trunnion members pivotally mounted to a respective one of two arc-shaped clamping elements of the clamp connector. The operating shaft is fixed to one of the trunnion members and displaceable connected to the other trunnion member. An actuating unit is configured to pull the operating shaft in the axial direction in order to bring the operating shaft into a pre-tensioned state while pivoting the clamping elements towards each other and into engagement with the ends of two tubular members to be connected to each other.

SUMMARY OF THE INVENTION

The object of the present invention is to provide a subsea clamp connector of new and favourable design.

It is also an object to present a subsea clamp connector being operable by an ROV.

According to embodiments of the invention, this object is achieved by a subsea clamp connector having the features defined in claim 1.

The subsea clamp connector comprises a base part, a first and second clamping element being articulately connected to the base part at a first end, and a locking unit comprising an operating shaft with a first and second retaining member, each clamping element being provided with a holding member comprising a shoulder and a slot suitable for receiving the operating shaft and the retaining members in such a way that one retaining member will abut on each of the shoulders, where an anchoring means is provided on the outer side of the first and second clamping elements, the anchoring means being able to anchor an actuating device to the clamping elements to enable a rotating movement of the clamping elements be means of the actuating device.

In some embodiments of the above subsea clamp connector, the first and second retaining members of the locking unit are provided with internal threads being in engagement with a first and second external thread on the operating shaft, the first and second external threads being threaded in opposite directions allowing the first and second retaining members to be moved towards or away from each other on the operating shaft by rotation of the operating shaft.

In some embodiments of the above subsea clamp connector, a torque bucket is connected to one end the operating shaft of the locking unit, the torque bucket being connectable to a torque tool by means of an ROV.

The torque bucket of the clamp connector can be connected to a holder being releasably engaged with one of the clamping elements to prevent rotation of the torque bucket when the locking unit is connected to the clamping elements.

In some embodiments the above mentioned holder is formed as an arm where an upper end is fixed to the torque bucket and a lower end comprises projections configured for engagement with opposite lateral surfaces on one of the clamping elements.

In some embodiments of the clamp connector, the first retaining member of the locking device is fixed to the operating shaft at the first end thereof and the second retaining member is slidably mounted to the operating shaft, the second retaining member having an axially extending opening in which a locking nut is arranged, the locking nut being provided with an internal thread for engagement with an external thread on the operating shaft and being movable along the operating shaft between a first and a second wall of the second retaining member.

In some embodiments of the clamp connector, a head with a shoulder is provided on the second end of the operating shaft, the shoulder facing the second retaining member and being configured for engagement with an actuating tool that can be used for pulling or pushing the second end of the operating shaft away from the second retaining member and thereby bringing the operating shaft into a pre-tensioned state.

In some embodiments, the actuating tool is provided with a stroking device for moving the second end of the operating shaft away from the second retaining member when the locking unit is mounted to the first and second clamping elements, In some embodiments, the actuating tool further comprises a rotatable actuating member and a drive motor for rotating the actuating member, the actuating member being configured to act on the locking nut to rotate the locking nut and thereby move the locking nut by screwing along the operating shaft into engagement with a shoulder on the second retaining member to lock the operating shaft to the first and second holding members in its pre-tensioned state and thereby lock the first and second clamping elements to the ends of a first and a second tubular member.

Embodiments of the invention also relate to an actuating device suitable for moving clamping elements of a clamp connector comprising a base part and two clamping elements pivotably connected to the base part, the clamping elements being provided with anchoring means on a side of each clamping element facing away from a centre of the connector, the actuating device comprises a first and second arm being pivotably connected to each other in a first end by means of a joint J3, elongated engagement members being arranged at the second end of the arms for engagement with the anchoring means on the clamping elements.

In some embodiments of the above described actuating device, it further comprises a power member being configured to act between the first and second arms to pivot the first and second arms in relation to each other.

In some embodiments of the actuating device, at least one engagement member comprises two elements with a gap therebetween to enable passage over the operating shaft, the two elements of the engagement member being connectable to the anchoring means.

The power member can be a hydraulic cylinder or an electric motor.

The described actuating device is it suitable for use with a subsea clamp connector according to embodiments of the invention.

Embodiments of the invention also relate to a method for connecting a first tubular member to a second tubular member by means of a clamp connector as described herein, comprising:

setting the first and second clamping element in open position, entering the ends of the first and second tubular member into the centre of the clamp connector, connecting an actuating device as described herein to the anchoring means on the clamping elements, moving the clamping elements to a closed or mainly closed position by means of the actuating device, entering the locking device of the clamp connector into the slots of the clamping elements, and locking the clamp connector by means of the locking device.

Further features of the subsea clamp connector will appear from the description following below.

BRIEF DESCRIPTION OF THE DRAWINGS

With reference to the appended drawings, a specific description of preferred embodiments of the invention cited as examples follows below.

In the drawings.

DETAILED DESCRIPTION

A subsea clamp connector 1 according to two different embodiments of the present invention is illustrated in FIGS. 1 and 2 and FIGS. 11-13, respectively. The clamp connector 1 is to be used for connecting and securing an end of a tubular member (not shown) to an abutting end of another tubular member (not shown).

The clamp connector 1 comprises a base part 10, a first clamping element 20 articulately connected to the base part 10 and a second clamping element 30 articulately connected to the base part 10. In the illustrated example, the base part 10 and the clamping elements 20, 30 are arc-shaped. Each clamping element 20, 30 has a hinged first end 21a, 31a and an opposite second end 21b, 31b. The base part 10 is at one end articulately connected to the first end 21a of the first clamping element 20 through a first joint J1, which forms a first pivot axis, and at its other end articulately connected to the first end 31a of the second clamping element 30 through a second joint J2, which forms a second pivot axis that extends in parallel with said first pivot axis of said first joint J1.

Figures 1, 2, 3:
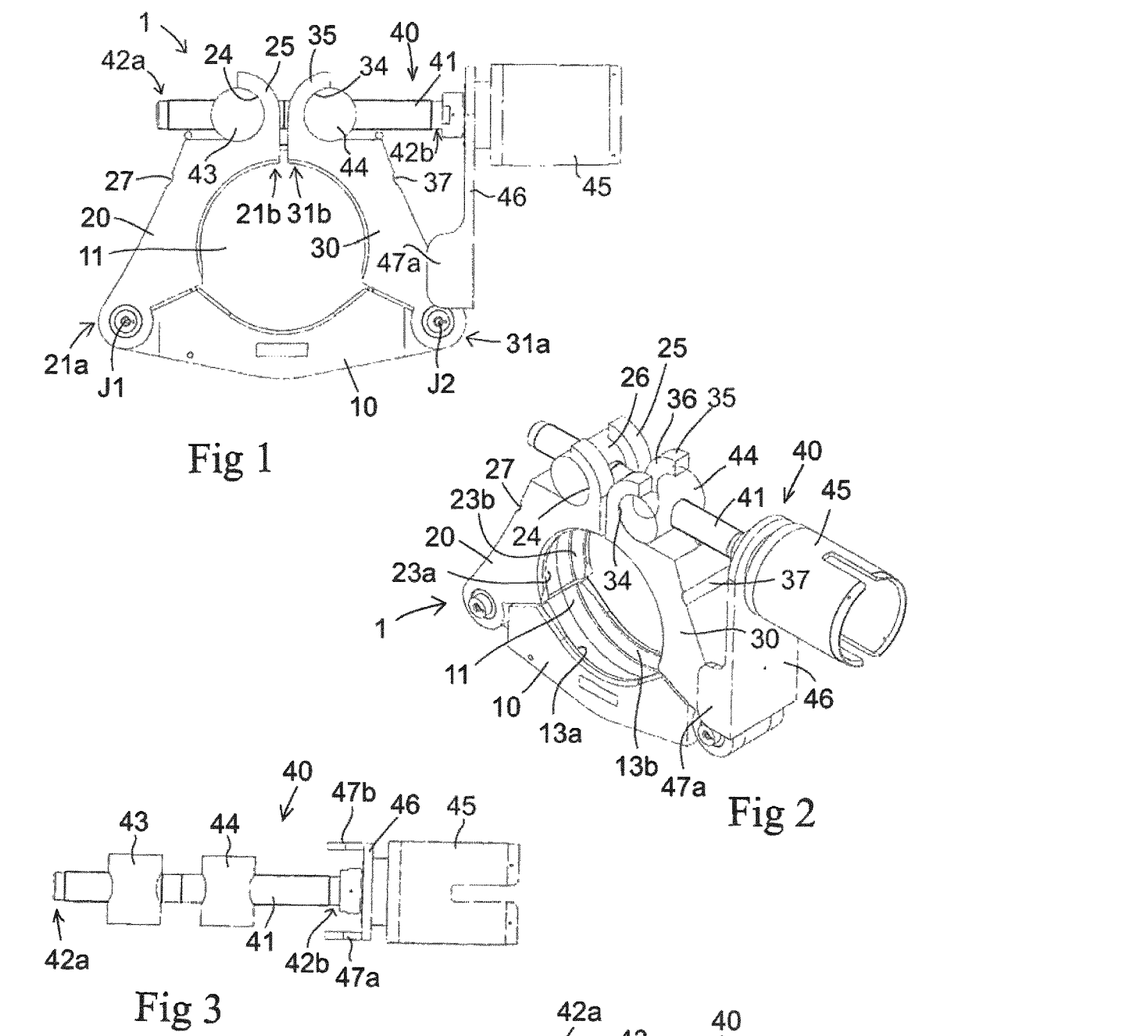
FIG. 1 is a lateral view of a subsea clamp connector.
FIG. 2 is a perspective view of the clamp connector of FIG. 1.
FIG. 3 is a planar view from above of a locking unit included in the clamp connector of FIG. 1.
Figure 4:
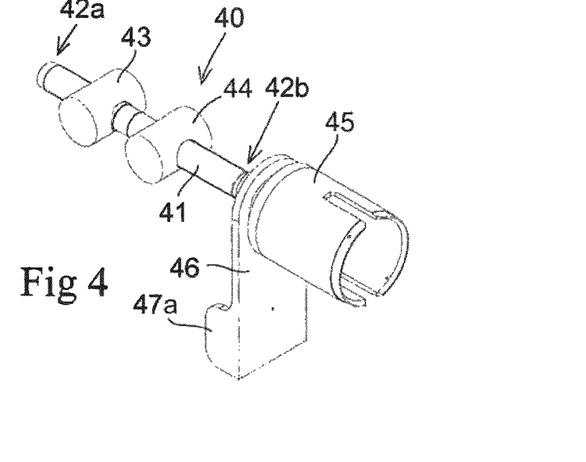
FIG. 4 is a perspective view of the locking unit of FIG. 3.
Figures 5, 6:
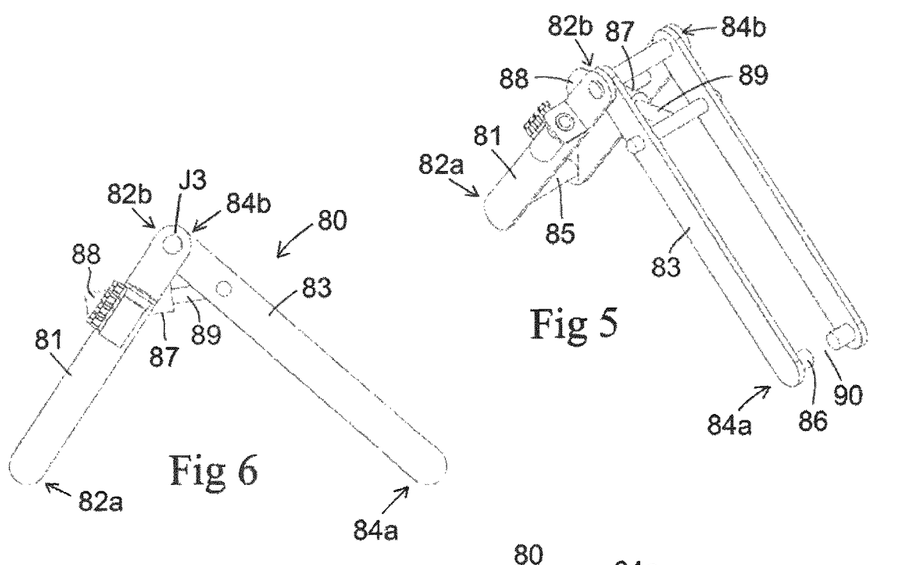
FIG. 5 is a perspective view of an actuating device to be used with the clamp connector of FIG. 1.
FIG. 6 is a lateral view of the actuating device of FIG. 5.
Figure 7:
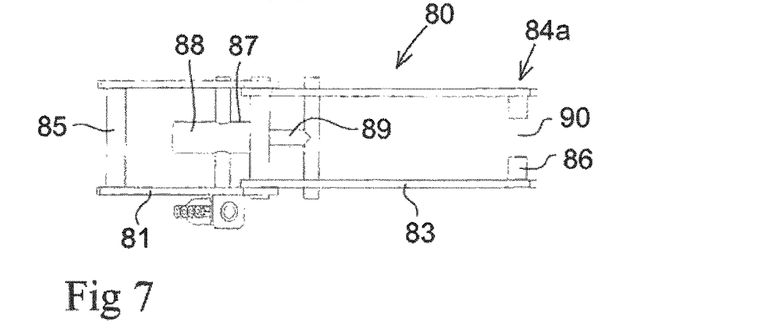
FIG. 7 is a planar view from above of the actuating device of FIG. 5.
Figure 8:
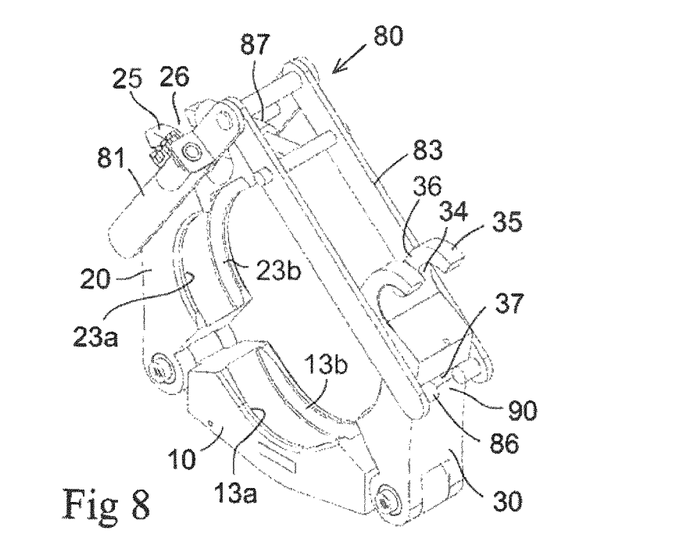
FIG. 8 is a perspective view of the actuating device of FIG. 5 in engagement with the clamping elements of the clamp connector of FIG. 1, as seen with the clamping elements in an open position.
Figure 9:
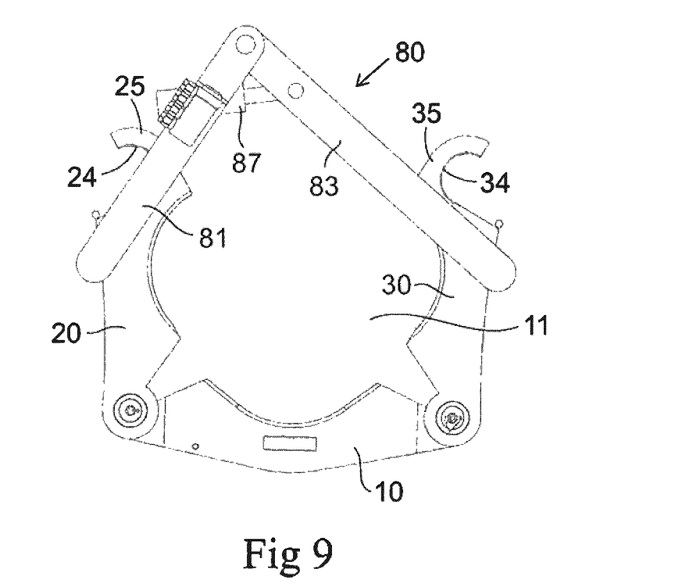
FIG. 9 is a lateral view corresponding to FIG. 8.
Figure 10:
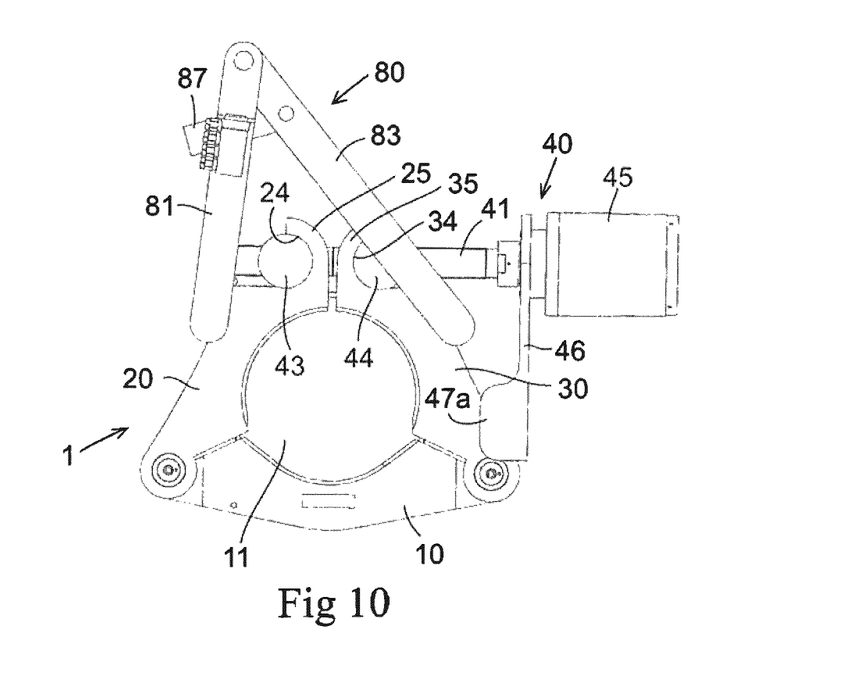
FIG. 10 is a lateral view of the actuating device of FIG. 5 in engagement with the clamping elements of the clamp connector of FIG. 1, as seen with the clamping elements in a closed position and with a locking unit mounted to the clamping elements.
Figure 11:
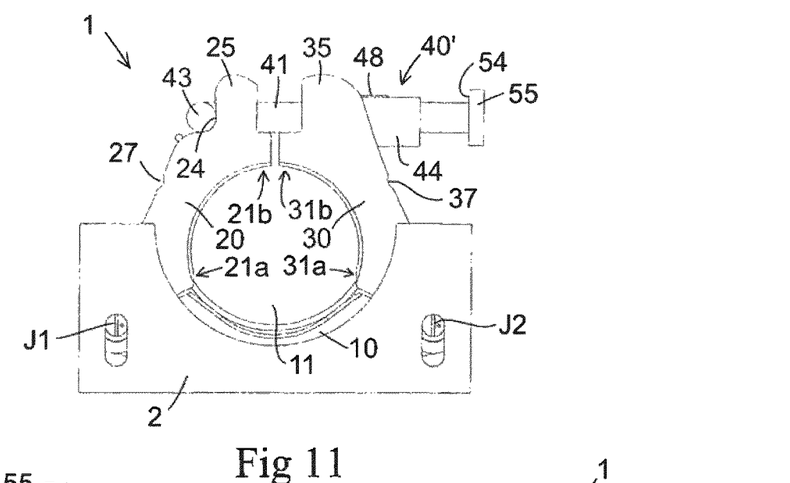
FIG. 11 is a lateral view of a subsea clamp connector.
Figure 12:
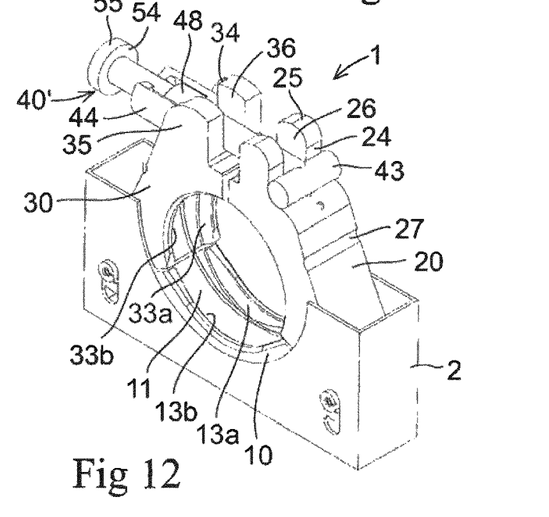
FIG. 12 is a perspective view of the clamp connector of FIG. 11.
Figure 13:
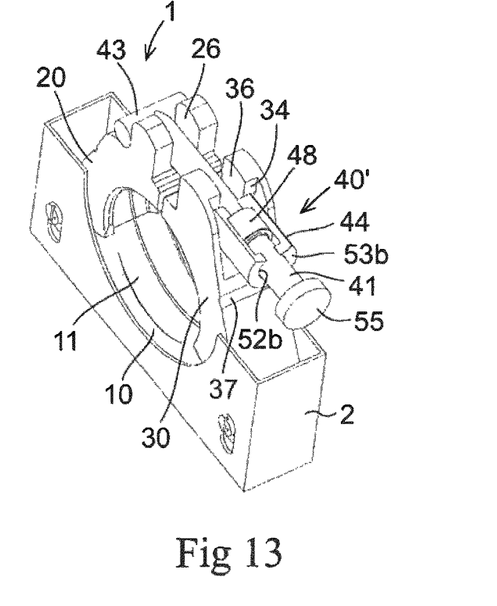
FIG. 13 is a perspective view from another direction of the clamp connector of FIG. 11.
Figure 14:
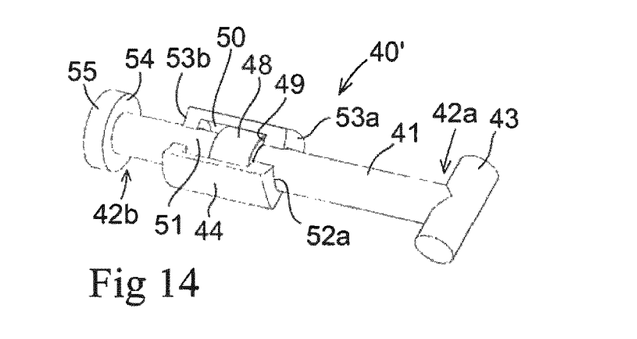
FIG. 14 is a perspective view of a locking unit included in the clamp connector of FIG. 11.

In the embodiment illustrated in FIGS. 11-13, the base part 10 and the first ends 21a, 31a of the first and second clamping elements 20, 30 are received in a housing 2.

A space 11 for receiving the ends of two tubular members to be connected to each other is formed between the base part 10 and the clamping elements 20, 30. A centre of the connector can be defined as the centre of this space when the clamping elements 20, 30 are connected to each other at the second ends 21b, 31b.

On the side facing the above-mentioned space 11, the base part 10 has opposed bevelled wedging surfaces 13a, 13b (see FIGS. 2 and 12) for engaging corresponding bevelled wedging surfaces provided at the abutting ends of the tubular members to be connected to each other. The respective clamping element 20, 30 has corresponding bevelled wedging surfaces 23a, 23b, 33a, 33b on the side thereof facing the space 11. The wedging surface of the respective tubular member is for instance provided on a flange arranged at the end of the tubular member.

The first and second clamping elements 20, 30 are pivotable in relation to the base part 10 between an open position (see FIGS. 8, 9, 16 and 17), in which the second end 21b of the first clamping element 20 and the second end 31b of the second clamping element 30 are spaced apart from each other, and a closed position (see FIGS. 1, 2, 10, 11-13, 18 and 22-24), in which the second end 21b of the first clamping element 20 and the second end 31b of the second clamping element 30 are next to each other with the first and second clamping elements 20, 30 in clamping engagement with the ends of said tubular members through the above-mentioned wedging surfaces.

The clamp connector 1 further comprises a locking unit 40, 40' for locking the first and second clamping elements 20, 30 in said closed position. The locking unit 40, 40' comprises:

an operating shaft 41 having a first end 42a and an opposite second end 42b;

a first retaining member 43 mounted to the operating shaft 41, wherein the first retaining member 43 is configured for engagement with a shoulder 24 on a first holding member 25 which extends from the second end 21b and the first clamping element 20, and a second retaining member 44 mounted to the operating shaft 41, wherein the second retaining member 44 is configured for engagement with a shoulder 34 on a second holding member 35 which extends from the second end 31b of the second clamping element 30.

Said shoulder 24 on the first holding member 25 faces away from said shoulder 34 on the first holding member 35.

Each holding member 25, 35 is, in an embodiment, formed as an integrated part of the associated clamping element 20, 30, which implies that the first holding member 25 and the remaining part of the first clamping element 20 are formed in one piece and that the second holding member 35 and the remaining part of the second clamping element 30 are formed in one piece. However, it is also conceivable that the holding members 25,35 are holding elements being fastened to each of the first and second clamping elements.

The first holding member 25 comprises an outwardly open slot 26 in connection with the shoulder 24 of the first holding member and configured to receive a part of the operating shaft 41 of the locking unit 40, 40'. The second holding member 35 comprises an outwardly open slot 36 in connection with the shoulder 34 on the second holding member and configured to receive a part of the operating shaft 41 of the locking unit 40, 40'.

The locking unit 40, 40' is detachably mountable to the first and second clamping elements 20, 30 by insertion of the operating shaft 41 sideways into said slots 26, 36 of the first and second holding members 25, 35. Depending on the length of the operating shaft 41, the locking unit 40 40' may be mounted to the first and second clamping elements 20, 30 when the first and second clamping elements 20, 30 are in open, partially closed or closed position.

The first and second clamping elements 20, 30 extend from the base part 10 and are pivotable in relation to the base part 10 in the same plane. The above-mentioned slots 26, 36 of the first and second holding members 25, 25 are aligned and face outwards from the center of the connector when the first and second clamping elements 20, 30 are in the closed position. Thereby is the operating shaft 41 of the locking unit 40, 40' allowed to be inserted into these slots 26, 36 by approaching the locking unit 40, 40' to the slots 26, 36 with the operating shaft 41 in position parallel to the slots.

When the locking unit 40, 40' has been mounted to the first and second clamping elements 20, 30 with the operating shaft 41 received in the slots 26, 36 of the first and second holding members 25, 35 and with the first and second retaining members 43, 44 next to the associated shoulders 24, 34 on the first and second holding members 25, 35, the first and second retaining members 43, 44 may be moved towards each other by means of a suitable tool in order to be pressed against said shoulders 24, 34 and thereby secure the first and second clamping elements 20, 30 in a tensioned state to the ends of the above-mentioned first and second tubular members.

In the embodiment illustrated in FIGS. 1-10, the first and second retaining members 43, 44 of the locking unit 40 are in threaded engagement with the operating shaft 41, wherein the first retaining member 43 is provided with an internal thread that is in engagement with a first external thread on the operating shaft 41 and the second retaining member 44 is provided with an internal thread that is in engagement with a second external thread on the operating shaft. Said first and second external threads on the operating shaft 41 are threaded in opposite directions so as to allow the first and second retaining members 43, 44 to be moved along the operating shaft 41 towards each other by a rotation of the operating shaft 41 in a first rotary direction and to be moved along the operating shaft 41 away from each other by a rotation of the operating shaft 41 in an opposite second rotary direction.

The operating shaft 41 is rotated by means of a torque tool (not shown) that may be detachably connected to a socket (not shown) fixed to an end of the operating shaft. Said socket is rotatably connected to a torque bucket 45 and received in an inner space of the torque bucket. When the operating shaft 41 is to be rotated, a torque tool is detachably mounted to the torque bucket 45, for instance by means of an ROV (ROV=Remotely Operated Vehicle) or a diver, in such a manner that a housing of the torque tool is attached to the torque bucket and a rotatable tool member of the torque tool is connected to the socket.

The torque bucket 45 is fixed to a holder 46 which is configured to be releasably engaged with one of the clamping elements 20, 30 in order to prevent the torque bucket 45 from rotating when the torque tool is operated. In the illustrated example, the holder 46 has the form of an arm, which at an upper end is fixed to the torque bucket 45 and at a lower end is provided with projections 47a, 47b configured for engagement with opposite lateral surfaces on one of the clamping elements 20, 30. The holder 46 may of course also have any other suitable design, as long as it is capable of preventing a rotation of the torque bucket 45 when the locking unit 40 has been mounted to the clamping elements 20, 30.

In the embodiment illustrated in FIGS. 1-10, the first and second retaining members 43, 44 are cylindrical and extend perpendicularly to the longitudinal axis of the operating shaft 41, wherein the associated shoulders 24, 34 on the first and second holding members 25, 35 are curved to conform to the envelope surface of the retaining members 43, 44.

In the embodiment illustrated in FIGS. 11-24, the first retaining member 43 of the locking unit 40' is fixed to the operating shaft 41 at the first end 42a thereof, whereas the second retaining member 44 is slidably mounted to the operating shaft 41 so as to be axially slidable along the operating shaft.

In this case, the locking unit 40' comprises a locking nut 48, which is provided with an internal thread that is in engagement with an external thread on the operating shaft 41. The locking nut 48 is, by screwing, moveable along the operating shaft 41 into engagement with a shoulder 49 on the second retaining member 44 to thereby prevent a movement of the second retaining member 44 in a direction away from the first retaining member 43 when the locking unit 40' is mounted to the first and second clamping elements 20, 30 with the first retaining member 43 in contact with the shoulder 24 on the first holding member 25 and the second retaining member 44 in contact with the shoulder 34 on the second holding member 35. The locking nut 48 is located in a cavity 50 provided in the second retaining member 44, wherein the second retaining member 44 has an axially extending opening 51 through which the locking nut 48 is accessible for rotation thereof.

In the illustrated example, the first retaining member 43 is cylindrical and extends perpendicularly to the longitudinal axis of the operating shaft 41. In the illustrated example, the second retaining member 44 has the form of an open sleeve, wherein the operating shaft 41 extends through an opening 52a provided in a first end wall 53a of the second retaining member 44 and through another opening 52b provided in an opposite second end wall 53b of the second retaining member 44.

In the embodiment illustrated in FIGS. 11-24, a shoulder 54 is provided on the operating shaft 41 at the second end 42b thereof, wherein this shoulder 54 faces the second retaining member 44 and is configured for engagement with an actuating tool to be used for pulling or pushing the second end 42b of the operating shaft 41 away from the second retaining member 44 and thereby bring the operating shaft into a pre-tensioned state.

One possible embodiment of such an actuating tool 60 is illustrated in FIGS. 19-24. This actuating tool 60 is provided with a stroking device 61 for moving the second end 42b of the operating shaft 41 away from the second retaining member 44 when the locking unit 40' has been mounted to the first and second clamping elements 20, 30, to thereby pretension the operating shaft 41.

The illustrated actuating tool 60 further comprises a rotatable actuating member 62 and a drive motor 63 for rotating the actuating member, wherein this actuating member 62, when the operating shaft 41 is kept in said pre-tensioned state by the stroking device 61, is configured to act on the locking nut 48 so as to rotate the locking nut and thereby move the locking nut 48 by screwing along the operating shaft 41 into engagement with the above-mentioned shoulder 49 on the second retaining member 44 in order to lock the operating shaft 41 to the first and second holding members 25, 35 in its pre-tensioned state and thereby lock the first and second clamping elements 20, 30 to the ends of the above-mentioned first and second tubular members.

In the illustrated example, the actuating member 62 has the form of a rotatably mounted wheel which has an envelope surface configured for frictional engagement with the envelope surface of the locking nut 48. The drive motor 63 is a hydraulic motor.

In the illustrated embodiment, the above-mentioned shoulder 54 on the operating shaft 41 constitutes a surface on a head 55 which is provided on the operating shaft 41 at the second end 42b thereof.

In the illustrated embodiment, the stroking device 61 comprises a first part 64a with a first contact element 65 configured for contact with the second retaining member 44 and a second part 64b with a second contact element 66 configured for contact with the shoulder 54 at the second end 42b of the operating shaft 41. Said first and second parts 64a, 64b are axially moveable in relation to each other by means of two hydraulic cylinders 67 in order to allow the distance between said first and second contact elements 65, 66, and thereby also the distance between the second end 42b of the operating shaft 41 and the second retaining member 44, to be increased.

The hydraulic cylinders 67 are arranged in parallel with each other and each hydraulic cylinder 67 comprises a cylinder part 68, a piston (not shown) displaceably received inside the cylinder part and a piston rod 69 fixed to the piston. In the illustrated example, the cylinder parts 68 of the hydraulic cylinders 67 are fixed to the above-mentioned second contact element 66, whereas the piston rods 69 of the hydraulic cylinders 67 are fixed to the above-mentioned first contact element 65. Also the drive motor 63 is fixed to the first contact element 65.

An actuating device 80 (see FIGS. 5-10 and 15-18) is provided for pivoting the first and second clamping elements 20, 30 in relation to the base part 10 from the open position to the closed position and thereby pivoting the first and second clamping elements 20, 30 into engagement with the ends of the above-mentioned first and second tubular members by means of an ROV.

The actuating device 80 is detachably connectable to the first and second clamping elements 20, 30. The actuating device 80 comprises a first arm 81, which has a lower end 82a and an upper end 82b, wherein the lower end 82a of the first arm 81 is configured for releasable engagement with the first clamping element 20 at a position between the first and second ends 21a, 21b thereof. The first and second arms of the actuating device are pivotably connected to each other in a first end by means of a joint J3.

The actuating device 80 also comprises a second arm 83, which has a lower end 84a and an upper end 84b, wherein the lower end 84a of the second arm 83 is configured for releasable engagement with the second clamping element 30 at a position between the first and second ends 31a, 31b thereof.

In the illustrated embodiments, the first arm 81 is provided with an elongated engagement member 85 at its lower end 82a configured for releasable engagement with an anchoring means 27 on the outer side of the first clamping element 20, and the second arm 83 is provided with an elongated engagement member 86 at its lower end 84a configured for releasable engagement with a corresponding anchoring means 37 on the outer side of the second clamping element 30.

In the shown embodiments, the anchoring means 27, 37 are a recess on the outer surface or side of the first and second clamping elements 20, 30. However, the anchoring means can also be an protruding organ such as a hook or tap that the engagement members 85 can abut against when in use. The main object of the anchoring means 27, 37 is to hold the lower ends 82a, 84a in position on the outer sides of the first and second clamping elements 20, 30.

The upper end 82b of the first arm 81 is pivotally connected to the upper end 84b of the second arm 83, and the actuating device 80 comprises a power member 87 which is configured to act between the first and second arms 81, 83 in order to pivot the first and second arms 81, 83 in relation to each other.

In the illustrated embodiments, the power member 87 is a hydraulic cylinder which comprises a cylinder part 88 articulately connected to one of the arms 81, 83, a piston (not shown) displaceably received inside the cylinder part and a piston rod 89 articulately connected to the other one of the arms 81, 83. The power member 87 can also be an electric motor.

To be operated by an ROV (Remotely Operated Vehicle) at least one gripping organ (not shown) should be added to the actuating device 80. The gripping tool can be a bar or bow being fixed to one or both of the arms 81, 83 to protrude out from the actuating device 80. The gripping tools of the ROV can then hold and operate the actuating device via the gripping organs.

When two tubular members are to be connected to each other by means of a clamp connector 1 according to the embodiment illustrated in FIGS. 1-10, the first and second clamping elements 20, 30 are placed in open position, thereby forming an open space into which tubular members can be entered. The tubular members are positioned end-to-end with opposite ends of the tubular members received in the space 11 formed between the base part 10 and the clamping elements 20, 30 of the clamp connector 1.

When received in said space 11, the ends of the tubular members rest on the base part 10 of the clamp connector 1. The clamping elements 20, 30 are in the open position (see FIGS. 8 and 9) when the ends of the tubular members are inserted into said space 11. The clamping elements 20, 30 are then pivoted towards each other by means of the above-mentioned actuating device 80 in order to assume the closed position with the second end 21b of the first clamping element 20 and the second end 31*b* of the second clamping element 30 next to each other.

This pivotal movement is achieved by pivoting the arms 81, 83 of the actuating device 80 towards each other under the effect of the power member 87. The clamping elements 20, 30 will come into contact with the ends of said tubular members when the clamping elements 20, 30 are pivoted from the open position to the closed position.

When the clamping elements 20, 30 have assumed closed or mainly closed position, the locking unit 40 is mounted to the first and second clamping elements 20, 30 by lowering the operating shaft 41 into the slots 26, 36 of the first and second holding members 25, 35.'The locking unit 40 is positioned with the first retaining member 43 next to the shoulder 24 on the first holding member 25, with the second retaining member 44 next to the shoulder 34 on the second holding member 35 and with the projections 47*a*, 47*b* of the holder 46 overlapping lateral surfaces on opposite sides of the second clamping element 30.

The actuating device 80 may now be released from the first and second clamping elements 20, 30. The engagement member 86 configured for engagement with the anchoring means or recess 37 in the second clamping element 30 is provided with a gap 90 in order to allow this engagement member 86 to pass the operating shaft 41 when the actuating device 80 is removed from the clamp connector 1.

A torque tool (not shown) is then connected to the torque bucket 45 and operated in order to rotate the operating shaft 41 and thereby move the first and second retaining members 43, 44 towards each other and into contact with the shoulders 24, 34 on the holding members 25, 35 until the operating shaft 41 has been pre-tensioned to a desired extent. The locking unit 40 thereby locks the first and second clamping elements 20, 30 in the closed position in clamping engagement with the end of the two tubular members to be connected to each other. The torque tool may then be released from the torque bucket 45.

When two tubular members are to be connected to each other by means of a clamp connector 1 according to the embodiment illustrated in FIGS. 11-24, the tubular members are positioned end-to-end with opposite ends of the tubular members received in the space 11 formed between the base part 10 and the clamping elements 20, 30 of the clamp connector 1.

Figures 15, 16:
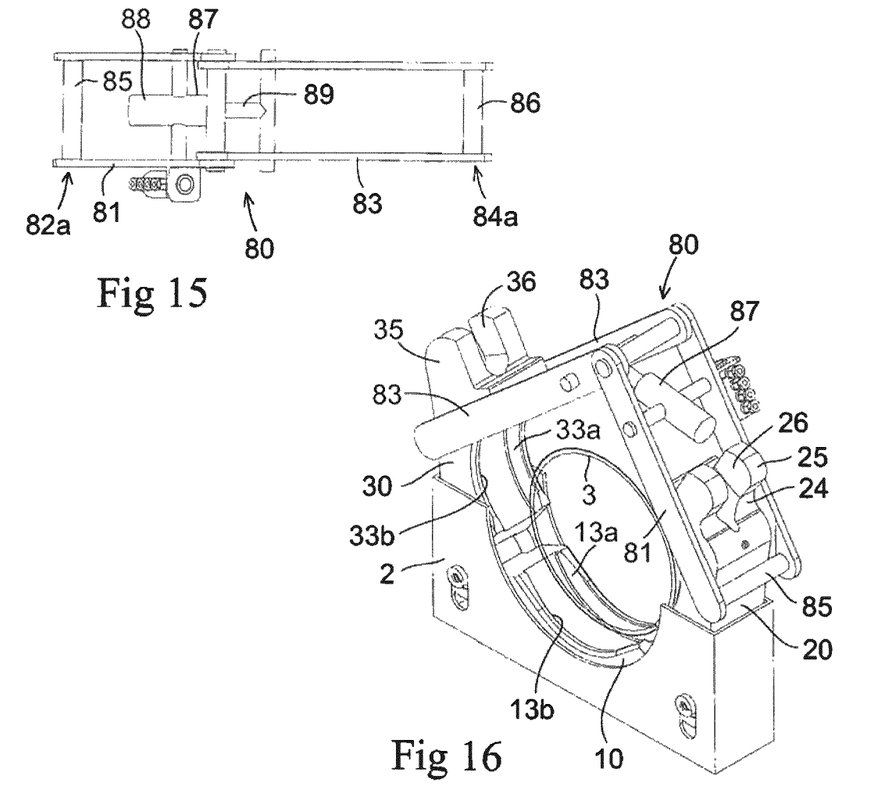
FIG. 15 is a planar view from above of an actuating device to be used with the clamp connector of FIG. 11.
FIG. 16 is a perspective view of the actuating device of FIG. 15 in engagement with the clamping elements of the clamp connector of FIG. 11, as seen with the clamping elements in an open position.
Figure 17:
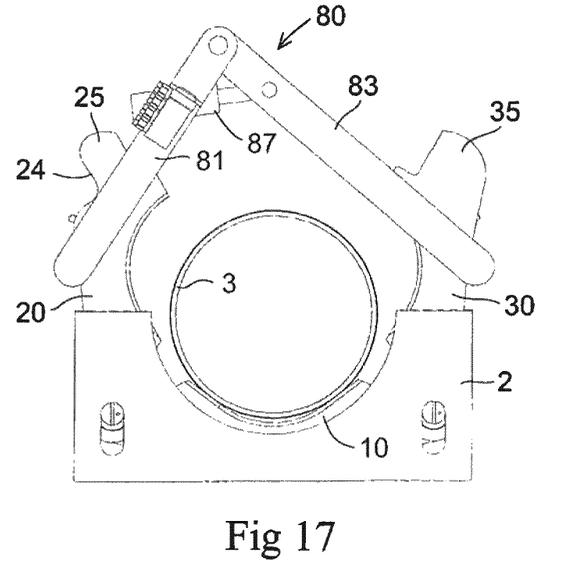
FIG. 17 is a lateral view corresponding to FIG. 16.
Figure 18:
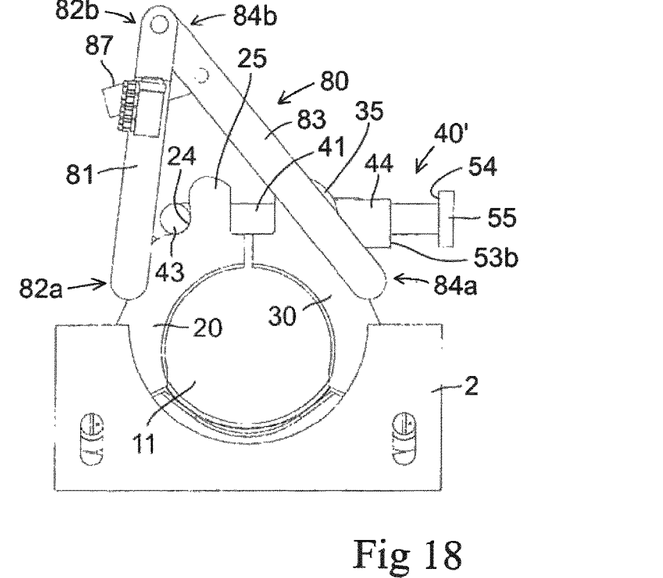
FIG. 18 is a lateral view of the actuating device of FIG. 15 in engagement with the clamping elements of the clamp connector of FIG. 11, as seen with the clamping elements in a closed position and with a locking unit mounted to the clamping elements.
Figure 19:
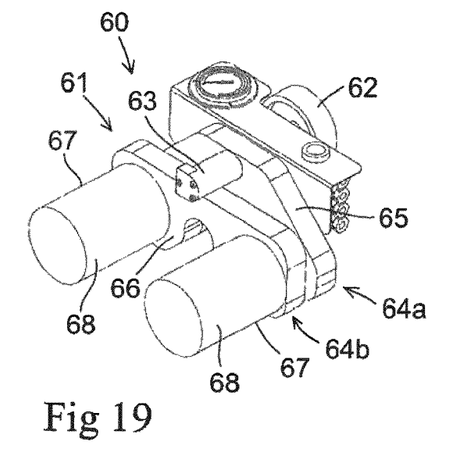
FIG. 19 is a perspective view of an actuating tool to be used with the clamp connector of FIG. 11.
Figure 20:
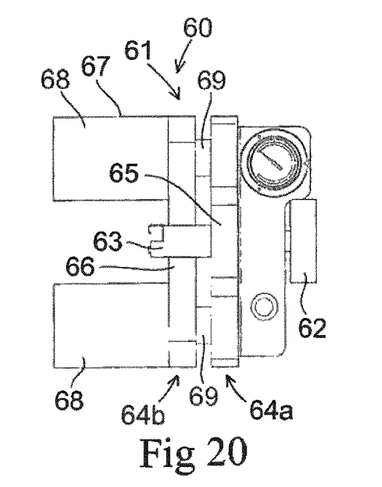
FIG. 20 is a planar view from above of the actuating tool of FIG. 19.
Figure 21:
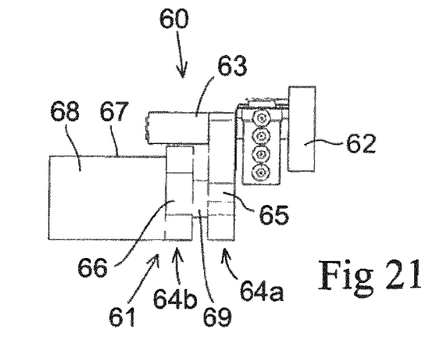
FIG. 21 is a lateral view of the actuating tool of FIG. 19.

When received in said space 11, the ends of the tubular members rest on the base part 10 of the clamp connector 1, as schematically illustrated by the ring 3 in FIGS. 16 and 17. The clamping elements 20, 30 are in the open position (see FIGS. 16 and 17) when the ends of the tubular members are inserted into said space 11.

The clamping elements 20, 30 are then pivoted towards each other by means of the above-mentioned actuating device 80 in order to assume closed or mainly closed position with the second end 21*b* of the first clamping element 20 and the second end 31*b* of the second clamping element 30 next to each other. This pivotal movement is achieved by pivoting the arms 81, 83 of the actuating device 80 towards each other under the effect of the power member 87.

The clamping elements 20, 30 will come into contact with the ends of said tubular members when the clamping elements 20, 30 are pivoted from the open position to the closed position. When the clamping elements 20, 30 have assumed the closed position, the locking unit 40' is mounted to the first and second clamping elements 20, 30 by entering the operating shaft 41 into the slots 26, 36 of the first and second holding members 25, 35. The locking unit 40' is thereby positioned with the first retaining member 43 next to the shoulder 24 on the first holding member 25 and with the second retaining member 44 next to the shoulder 34 on the second holding member 35.

Figures 22, 23, 24:
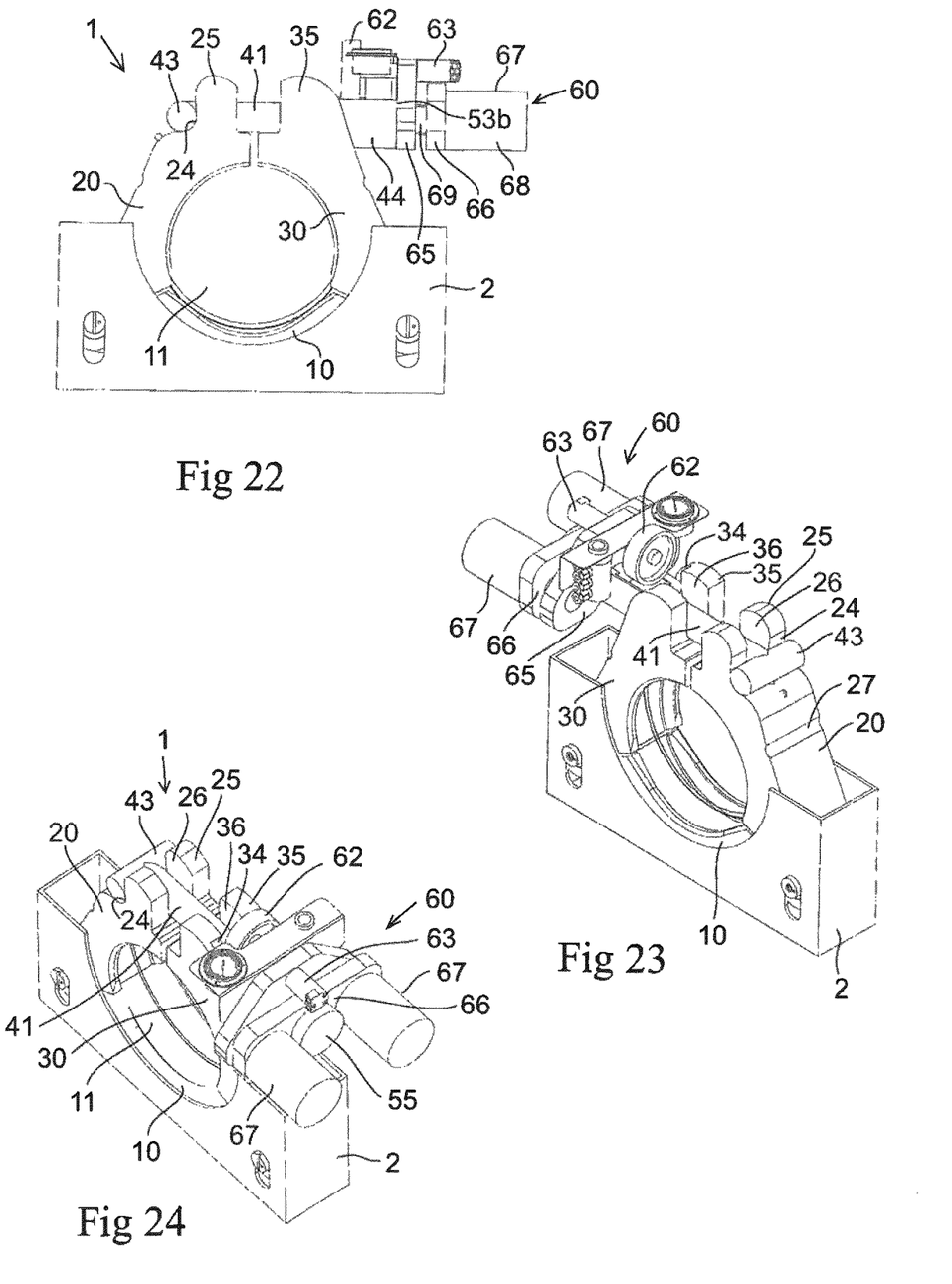
FIG. 22 is a lateral view of the actuating tool of FIG. 19 in engagement with a locking unit mounted to the clamping elements of the clamp connector of FIG. 11.
FIGS. 23, 24 are perspective views corresponding to FIG. 22.

The actuating device 80 is thereafter released from the first and second clamping elements 20, 30 and removed from the clamp connector 1. In the next step, the actuating tool 60 is mounted to the locking unit 40' by being moved into contact with the locking unit, as illustrated in FIGS. 22-24. The actuating tool 60 is thereby positioned with the first contact element 65 next to the second end wall 53*b* of the second retaining member 44, the second contact element 66 next to the shoulder 54 at the second end 42*b* of the operating shaft 41 and the actuating member 62 in contact with the locking nut 48.

The hydraulic cylinders 67 are then actuated in order to pretension the operating shaft 41 to a desired extent, whereupon the drive motor 63 is operated in order to rotate the actuating member 62 and thereby move the locking nut 48 into engagement with the shoulder 49 on the second retaining member 44. The operating shaft 41 is thereby locked to the first and second holding members 25, 35 in its pretensioned state, which in its turn implies that the locking unit 40' locks the first and second clamping elements 20, 30 in the closed position in clamping engagement with the end of the two tubular members to be connected to each other. The actuating tool 60 may then be released from the locking unit 40'.

As the clamp connector can be opened up and closed as explained above, tubular elements can be lowered into the open space of the clamp connector, instead of being pushed in from the side, which is the case when a prior art framed clamp connector is used. This is a substantial advantage when tubular elements that are lowered down to the seabed have to be connected. The tubular elements are made in steel and have a very limited flexibility. The ability of withstanding pushing and pulling to be positioned in a clamp connector is limited and complicates the operation of connecting the elements. However, if the tubular elements can be lifted up and lowered into an open clamp connector, the forces applied on the tubulars is minimized compared to a pushing and pulling process.

The combination of an actuating device that is operable by an ROV and a locking device also operable by an ROV completing the locking process substantially simplifies the process of connecting tubular elements and makes it possible to use the above described connector anywhere subsea.

As the actuating device is releasable, it can be used on multiple clamp connectors, thereby saving cost on tooling. It is also conceivable to add anchoring organs to existing clamp connectors and use the actuating device to close the clamp elements, even if the clamp was not originally designed for use with the actuating device.

The locking device is also removable and can be retrieved and replaced if necessary.

It is hereby described a subsea clamp connector for connecting and securing an end of a tubular member to an abutting end of another tubular member, the clamp connector (1) comprising:

a base part (10), a first clamping element (20), which has a hinged first end (21*a*) and an opposite second end (21*b*), wherein the first clamping element (20) is articulately connected to the base part (10) through its first end (21*a*), a second clamping element (30), which has a hinged first end (31*a*) and an opposite second end (31*b*), wherein the second clamping element (30) is articulately connected to the base part (10) through its first end (31*a*), the first and second clamping elements (20, 30) being pivotable in relation to the base part (10) between an open position, in which the second end (21*b*) of the first clamping element (20) and the second end (31*b*) of the second clamping element (30) are spaced apart from each other, and a closed position, in which the second end (21*b*) of the first clamping element (20) and the second end (31*b*) of the second clamping element (30) are next to each other with the first and second clamping elements (20, 30) in clamping engagement with the ends of said tubular members and a locking unit (40; 40') for locking the first and second clamping elements (20, 30) in said closed position, the locking unit (40; 40') comprising an operating shaft (41) having a first end (42*a*) and an opposite second end (42*b*), where the locking unit (40; 40') further comprises:

a first retaining member (43) mounted to the operating shaft (41), the first retaining member (43) being configured for engagement with a shoulder (24) on a first holding member (25) which is fixed to the first clamping element (20) at the second end (21*b*) thereof, and a second retaining member (44) mounted to the operating shaft (41), the second retaining member (44) being configured for engagement with a shoulder (34) on a second holding member (35) which is fixed to the second clamping element (30) at the second end (31*b*) thereof;

the first holding member (25) comprises an outwardly open slot (26) which is connected to the shoulder (24) on the first holding member and configured to receive a part of the operating shaft (41) of the locking unit (40; 40'), the second holding member (35) comprises an outwardly open slot (36) which is connected to the shoulder (34) on the second holding member and configured to receive a part of the operating shaft (41) of the locking unit (40: 40') and the locking unit (40; 40') is detachably mountable to the first and second clamping elements (20, 30) by insertion of the operating shaft (41) sideways into said slots (26, 36) of the first and second holding members (25, 35).

When the locking unit of a subsea installed clamp connector fails to operate properly and needs to be replaced, the locking unit can be removed from the clamping elements in a simple manner without requiring a retrieval of the remaining parts of the clamp connector, and a new locking unit may thereafter be mounted to the first and second clamping elements in a simple and quick manner. Thus, no retrieval of the entire clamp connector is required in order to replace the locking unit for a new locking unit, and the first and second clamping elements may consequently remain at the subsea installation site next to the ends of the tubular members during the replacement of the locking unit.

The first and second clamping elements (20, 30) of this clamp connector can extend upwards from the base part (10) being pivotable in relation to the base part (10) in a vertical plane. The first and second clamping elements (20, 30) can also be arc-shaped.

The first retaining member (43) can be fixed to the operating shaft (41) at the first end (42*a*) thereof and the second retaining member (44) can be slidably mounted to the operating shaft (41) so as to be axially slidable along the operating shaft. In these embodiments the locking unit (40') comprises a locking nut (48), which is provided with an internal thread that is in engagement with an external thread on the operating shaft (41), wherein the locking nut (48), by screwing, is moveable along the operating shaft (41) into engagement with a shoulder (49) on the second retaining member (44) to thereby prevent a movement of the second retaining member (44) in a direction away from the first retaining member (43) when the locking unit (40') is mounted to the first and second clamping elements (20, 30) with the first retaining member (43) in contact with the shoulder (24) on the first holding member (25) and the second retaining member (44) in contact with the shoulder (34) on the second holding member (35).

The locking nut (48) can be located in a cavity (50) provided in the second retaining member (44), the second retaining member (44) having an axially extending opening (51) through which the locking nut (48) is accessible.

The second retaining member (44) can have the form of an open sleeve, wherein the operating shaft (41) extends through an opening (52*a*) provided in a first end wall (53*a*) of the second retaining member (44) and through another opening (52*b*) provided in an opposite second end wall (53*b*) of the second retaining member (44).

A shoulder (54) can be provided on the operating shaft (41) at the second end (42*b*) thereof, wherein this shoulder (54) faces the second retaining member (44) and is configured for engagement with an actuating tool (60) that is to be used for pulling or pushing the second end (42*b*) of the operating shaft (41) away from the second retaining member (44) and thereby bringing the operating shaft into a pretensioned state. The first retaining member (43) can be cylindrical and extend perpendicularly to the longitudinal axis of the operating shaft (41).

A torque bucket (45) can be provided at one end of the operating shaft (41), wherein the torque bucket (45) is fixed to a holder (46) configured for releasable engagement with the first or second clamping element (30).

In this embodiment, the clamping elements of the clamp connector may be forced towards each other in order to be clamped to the end parts of two tubular members to be connected to each other by pulling or pushing the second end of the operating shaft away from the second retaining member.

The operation for clamping the clamping elements to the end parts of two tubular members can thereby be performed in a quick manner, and without requiring any threaded connections between the operating shaft and the clamping elements that could be damaged due to friction and wear. Furthermore, the locking nut may be screwed into the locking position before the pulling or pushing force on the second end of the operating shaft is released. Hereby, the locking nut may be moved into the locking position with low torque and with a minimal wear on the threaded connection between the locking nut and the operating shaft.

It is also described an actuating device (80) for pivoting the first and second clamping elements (20, 30) of the clamp connector in relation to the base part (10) from the open position to the closed position and thereby pivoting the first and second clamping elements (20, 30) into engagement with the ends of said tubular members where the actuating device (80) comprises a first arm (81), which has a lower end (82*a*) and an upper end (82*b*), the lower end (82*a*) of the first arm (81) being configured for releasable engagement with the first clamping element (20) at a position between the first and second ends (21*a*, 21*b*) thereof, the actuating device (80) comprises a second arm (83), which has a lower end (84*a*) and an upper end (84*b*), the lower end (84*a*) of the second arm (83) being configured for releasable engagement with the second clamping element (30) at a position between the first and second ends (31*a*, 31*b*) thereof, the upper end (82*b*) of the first arm (81) is pivotally connected to the upper end (84*b*) of the second arm (83) and the actuating device (80) comprises a power member (87), in an embodiment, in the form of a hydraulic cylinder, which is configured to act between the first and second arms (81, 83) in order to pivot the first and second arms (81, 83) in relation to each other.

It is also described a subsea clamp connector arrangement, comprising a subsea clamp connector (1) as described above, the subsea clamp connector arrangement comprises an actuating tool (60) provided with a stroking device (61) for pulling or pushing the second end (42b) of the operating shaft (41) away from the second retaining member (44) when the locking unit (40') is mounted to the first and second clamping elements (20, 30) and thereby bring the operating shaft (41) into a pre-tensioned state, the actuating tool (60) comprises a rotatable actuating member (62) and a drive motor (63) for rotating the actuating member, wherein this actuating member (62), when the operating shaft (41) is kept in said pre-tensioned state by the stroking device (61), is configured to act on the locking nut (48) so as to screw the locking nut along the operating shaft (41) into engagement with said shoulder (49) on the second retaining member (44) in order to lock the operating shaft (41) to the first and second holding members (25, 35) in its pre-tensioned state and thereby lock the first and second clamping elements (20, 30) to the ends of said tubular members.

In this arrangement, the stroking device (61) can comprise one or more hydraulic cylinders (67) for pulling or pushing the second end (42b) of the operating shaft (41) away from the second retaining member (44).

The locking unit can comprise an operating shaft (41), a first retaining member (43) mounted to the operating shaft and configured for engagement with a shoulder (24) on a holding member (25) fixed to the first clamping element, and a second retaining member (44) mounted to the operating shaft and configured for engagement with a shoulder (34) on a holding member (35) fixed to the second clamping element. The locking unit is detachably mountable to the clamping elements by insertion of the operating shaft sideways into slots (26, 36) provided in the holding members.

The invention is not restricted to the embodiments described above. On the contrary, many possibilities to modifications thereof will be apparent to a person ordinary skilled in the art without departing from the basic idea of the invention as defined in the appended claims.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A subsea clamp connector comprising:
   a base part;
   clamping elements comprising a first clamping element and a second clamping element articulately connected to the base part at a first end;
   a locking unit comprising an operating shaft with a first and second retaining member;
   a holding member provided on each clamping element comprising a shoulder and a slot configured to receive the operating shaft and the retaining members such that one retaining member will abut each of the shoulders;
   an actuator configured to rotate the first and the second clamping elements; and
   a torque bucket configured to connect to a torque tool, the torque bucket connected to one end of the operating shaft and to a holder releasably engaged with one of the clamping elements to prevent rotation of the torque bucket when the locking unit is connected to the clamping elements.

2. The subsea clamp connector according to claim 1 wherein the first and second retaining members of the locking unit are provided with internal threads being in engagement with a first and second external thread on the operating shaft, the first and second external threads being threaded in opposite directions allowing the first and second retaining members to be moved towards or away from each other on the operating shaft by rotation of the operating shaft.

3. The subsea clamp connector according to claim 1, wherein the holder is formed as an arm where an upper end is fixed to the torque bucket and a lower end comprises projections configured for engagement with opposite lateral surfaces on one of the clamping elements.

4. The subsea clamp connector according to claim 1, wherein the first retaining member of the locking device is fixed to the operating shaft at the first end thereof and the second retaining member is slidably mounted to the operating shaft, the second retaining member having an axially extending opening in which a locking nut is arranged, the locking nut being provided with an internal thread for engagement with an external thread on the operating shaft and being movable along the operating shaft between a first and a second wall of the second retaining member.

5. The subsea clamp connector according to claim 4, wherein a head with a shoulder is provided on the second end of the operating shaft, the shoulder facing the second retaining member and being configured for engagement with an actuating tool to be used for pulling or pushing the second end of the operating shaft away from the second retaining member and thereby bringing the operating shaft into a pre-tensioned state.

6. The subsea clamp connector according to claim 5, wherein the actuating tool is provided with a stroking device for moving the second end of the operating shaft away from the second retaining member when the locking unit is mounted to the first and second clamping elements.

7. The subsea clamp connector according to claim 6, wherein the actuating tool further comprises a rotatable actuating member and a drive motor for rotating the actuating member, the actuating member being configured to act on the locking nut to rotate the locking nut and thereby move the locking nut by screwing along the operating shaft into engagement with a shoulder on the second retaining member to lock the operating shaft to the first and second holding members in its pre-tensioned state and thereby lock the first and second clamping elements to the ends of a first and a second tubular member.

8. The subsea clamp connector according to claim 1, wherein the torque bucket is connectable to the torque tool via a Remotely Operated Vehicle.

\* \* \* \* \*